(12) United States Patent
Kinouchi et al.

(10) Patent No.: US 11,938,815 B2
(45) Date of Patent: *Mar. 26, 2024

(54) ACCELERATOR PEDAL SYSTEM

(71) Applicant: DENSO CORPORATION, Kariya (JP)

(72) Inventors: Soichi Kinouchi, Kariya (JP); Yuusuke Yoshida, Kariya (JP); Takuto Kita, Kariya (JP); Hideyuki Mori, Kariya (JP); Shinji Komatsu, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,842

(22) Filed: Aug. 23, 2022

(65) Prior Publication Data

US 2023/0061325 A1    Mar. 2, 2023

(30) Foreign Application Priority Data

Aug. 25, 2021   (JP) .................... 2021-137424

(51) Int. Cl.
   *G05G 1/30*     (2008.04)
   *B60K 26/02*    (2006.01)
   (Continued)

(52) U.S. Cl.
   CPC .......... *B60K 26/02* (2013.01); *B60W 30/143* (2013.01); *G05G 1/30* (2013.01); *B60K 26/021* (2013.01);
   (Continued)

(58) Field of Classification Search
   CPC ............ G05G 1/30; G05G 1/40; G05G 1/405; G05G 1/38; G05G 1/44; G05G 5/005;
   (Continued)

(56) References Cited

U.S. PATENT DOCUMENTS

| 7,706,953 B1 * | 4/2010 | Sun ................... B60W 30/143 |
| | | 340/441 |
| 2017/0217312 A1 * | 8/2017 | Schweinfurth ......... F02D 11/02 |

(Continued)

FOREIGN PATENT DOCUMENTS

| DE | 202008007799 U1 * | 12/2009 | ........... B60K 26/021 |
| EP | 2196348 A1 * | 6/2010 | ........... B60K 26/021 |

(Continued)

OTHER PUBLICATIONS

Machine Translation of DE-202008007799-U1.*

(Continued)

*Primary Examiner* — Vinh Luong
(74) *Attorney, Agent, or Firm* — Nixon & Vanderhye P.C.

(57) ABSTRACT

An accelerator pedal system includes a pedal lever configured to perform an operation in accordance with a step-on operation, a lock mechanism configured to restrict the operation of the pedal lever, and an actuator configured to switch between a locked state in which the operation of the pedal lever is restricted by the lock mechanism and an unlocked state in which the operation of the pedal lever is free from restriction by the lock mechanism. In the accelerator pedal system, a controller configured to change an energization amount to the actuator when a disturbance is detected during a vehicle traveling in the locked state. Thus, the lock state can be suitably controlled.

20 Claims, 13 Drawing Sheets

(51) Int. Cl.
    *B60K 28/02*         (2006.01)
    *B60W 30/14*         (2006.01)
    *G05G 5/00*         (2006.01)
    *G05G 5/03*         (2008.04)

(52) U.S. Cl.
    CPC ......... *B60W 2540/10* (2013.01); *G05G 5/005* (2013.01); *G05G 5/03* (2013.01)

(58) Field of Classification Search
    CPC ... G05G 5/03; G05G 5/05; G05G 5/28; B60K 26/02; B60K 26/021; B60K 2026/023; B60K 2026/22; B60K 2026/026; B60K 28/02; B60W 2540/10; B60W 30/143; B60W 30/14; B60W 50/16
    See application file for complete search history.

(56) References Cited

U.S. PATENT DOCUMENTS

| | | | | |
|---|---|---|---|---|
| 2017/0334458 | A1* | 11/2017 | Sato | B60W 60/0059 |
| 2019/0322172 | A1* | 10/2019 | O Meachair | B60W 30/143 |
| 2020/0019177 | A1* | 1/2020 | Tatourian | G05D 1/0214 |
| 2020/0039468 | A1* | 2/2020 | Narumi | G08B 21/06 |
| 2021/0086767 | A1* | 3/2021 | Matsunaga | B60W 60/00186 |
| 2021/0141411 | A1* | 5/2021 | Kitagawa | B60T 8/409 |
| 2021/0387523 | A1* | 12/2021 | Shinohara | G05G 5/03 |

FOREIGN PATENT DOCUMENTS

| | | | | |
|---|---|---|---|---|
| FR | 2790228 A1 * | 9/2000 | | G05G 1/30 |
| JP | 2004-60484 | 2/2004 | | |
| WO | WO 2017147727 A1 * | 9/2017 | | B60T 7/06 |

OTHER PUBLICATIONS

Machine Translation of EP-2196348-A1.*
"Linear Actuator," Wikipedia Page, dated by Wayback Machine to Jun. 5, 2020, URL:<https://web.archive.org/web/20200605003015/https://en.wikipedia.org/wiki/Linear_actuator>.*
"Trapezoidal Thread Form," Wikipedia Page, dated by Wayback Machine to Mar. 31, 2019, URL: <https://web.archive.org/web/20190331184607/https://en.wikipedia.org/wiki/Trapezoidal_thread_form>.*
Machine translation of Artis et al., FR 2790228 A1, Sep. 1, 2000 (Year: 2000).*
Machine translation of Xiao, WO 2017147727 A1, Sep. 8, 2017 (Year: 2017).*
U.S. Appl. No. 17/893,618 to Yuusuke Yoshida, filed Aug. 23, 2022 (25 pages).
U.S. Appl. No. 17/893,668 to Yuusuke Yoshida, filed Aug. 23, 2022 (22 pages).
U.S. Appl. No. 17/893,637 to Yuusuke Yoshida, filed Aug. 23, 2022 (34 pages).
U.S. Appl. No. 17/893,700 to Soichi Kinouchi, filed Aug. 23, 2022 (24 pages).
U.S. Appl. No. 17/893,801 to Soichi Kinouchi, filed Aug. 23, 2022 (25 pages).
U.S. Appl. No. 17/893,752 to Soichi Kinouchi, filed Aug. 23, 2022 (22 pages).
U.S. Appl. No. 17/893,883 to Soichi Kinouchi, filed Aug. 23, 2022 (28 pages).

* cited by examiner

ACCELERATOR PEDAL SYSTEM

CROSS REFERENCE TO RELATED APPLICATION

The application is based on a Japanese Patent Application No. 2021-137424 filed on Aug. 25, 2021, the contents of which are incorporated herein by reference in its entirety.

TECHNICAL FIELD

The present disclosure relates to an accelerator pedal system.

BACKGROUND

Conventionally, there is known a vehicle travel control device in which a reaction force against stepping on a pedal is increased so as to cause an accelerator pedal to function as a footrest. For example, a step-on pressure on an accelerator pedal is used to detect a request for switching from an operation time of an automatic speed control device (ASCD) to a non-operation time of the ASCD.

SUMMARY

According to an aspect of the present disclosure, an accelerator pedal system includes a pedal lever configured to perform an operation in accordance with a step-on operation, a lock mechanism configured to restrict the operation of the pedal lever, an actuator configured to switch between a locked state in which the operation of the pedal lever is restricted by the lock mechanism and an unlocked state in which the operation of the pedal lever is free from restriction by the lock mechanism, and a controller.

For example, the controller includes an actuator control unit configured to control a driving operation of the actuator. The actuator control unit may be configured to change an energization amount to the actuator when a disturbance is detected during a vehicle traveling in the locked state.

Alternatively, a controller may be configured to control a driving operation of the actuator. In this case, the controller is configured to change an energization amount to the actuator to increase a lock holding force by the lock mechanism, in response to a detected disturbance during a vehicle traveling in the locked state. Thus, it is possible to appropriately control a locking state of the pedal lever.

BRIEF DESCRIPTION OF DRAWINGS

The above and other objects, features and advantages of the present disclosure will be more clearly understood from the following detailed description with reference to the accompanying drawings. In the accompanying drawings.

DESCRIPTION OF EMBODIMENTS

For example, when a pedal is stepped on due to a disturbance such as a vehicle rapid deceleration or vibration, a footrest state is released even when the driver does not intend to accelerate, and there is a possibility that acceleration not intended by the driver occurs.

The present disclosure has been made in view of the above issues, and an object of the present disclosure is to provide an accelerator pedal system capable of appropriately controlling a state of locking of an accelerator pedal.

An accelerator pedal system according to the present disclosure will be described with reference to the drawings. Hereinafter, in a plurality of embodiments, substantially the same components are denoted by the same reference signs, and the description thereof is omitted.

First Embodiment

Figure 1:
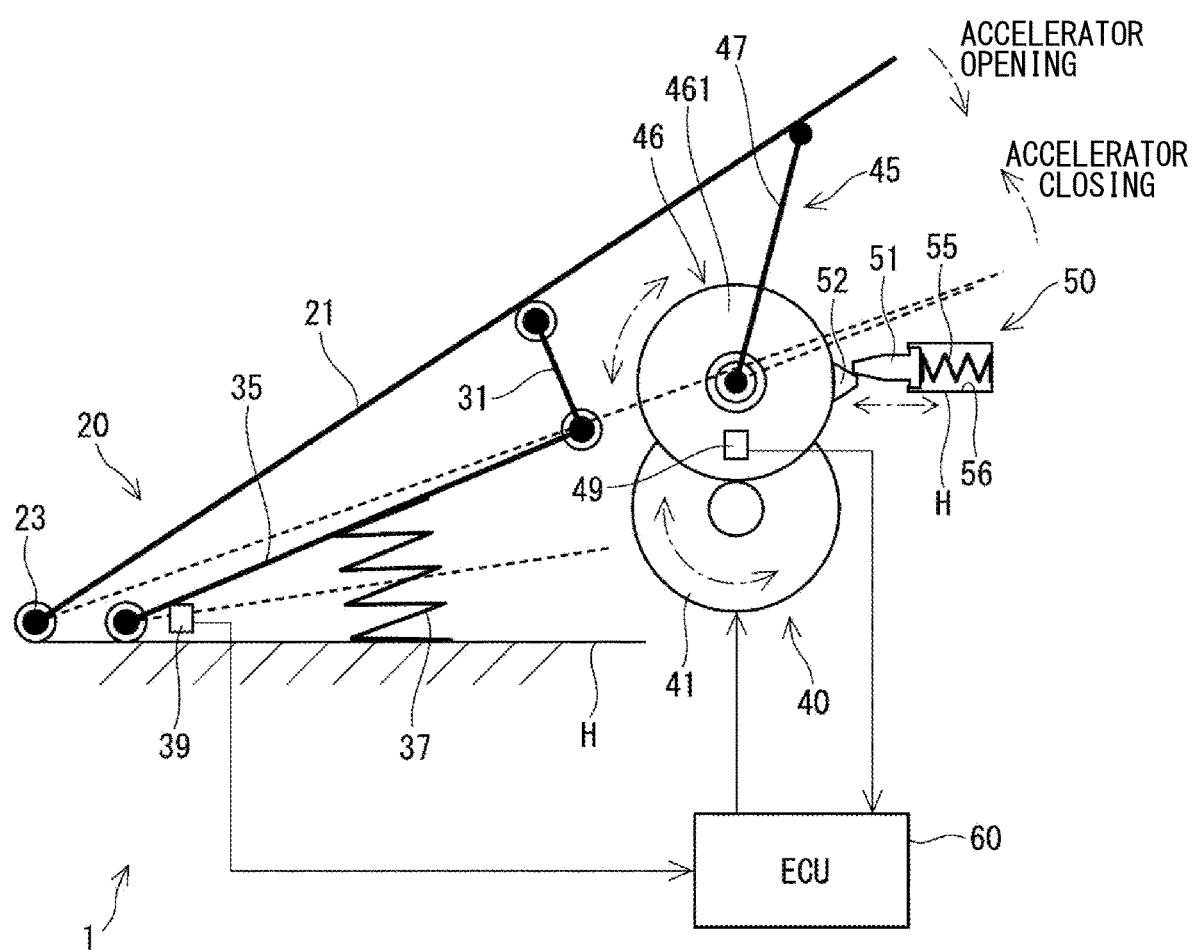
FIG. 1 is a schematic diagram illustrating an accelerator pedal system according to a first embodiment.

A first embodiment is disclosed with reference to FIGS. 1 to 8. As illustrated in FIG. 1, an accelerator pedal system 1 includes a pedal lever 20, an actuator 40, a power transmission mechanism 45, a lock mechanism 50, an electronic control unit (ECU) 60 serving as a controller, and the like.

The pedal lever 20 includes a pad 21, an arm 31, and a pedal 35, and is integrally driven by a driver's step-on operation or the like. The pad 21 is provided to be operable by a driver's step-on operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by driving of a motor 41 or a step-on operation of the pedal lever 20 are collectively referred to as a "housing H".

The arm 31 couples between the pad 21 and the pedal 35. One end of the pedal 35 is rotatably supported by the housing H, and the other end is connected to the arm 31. With this arrangement, the pad 21, the arm 31, and the pedal 35 are integrally driven by an operation of the pad 21 by the driver. A pedal opening degree sensor 39 that detects a pedal opening degree $\theta$ is provided on one end side of the pedal 35.

Figure 2:
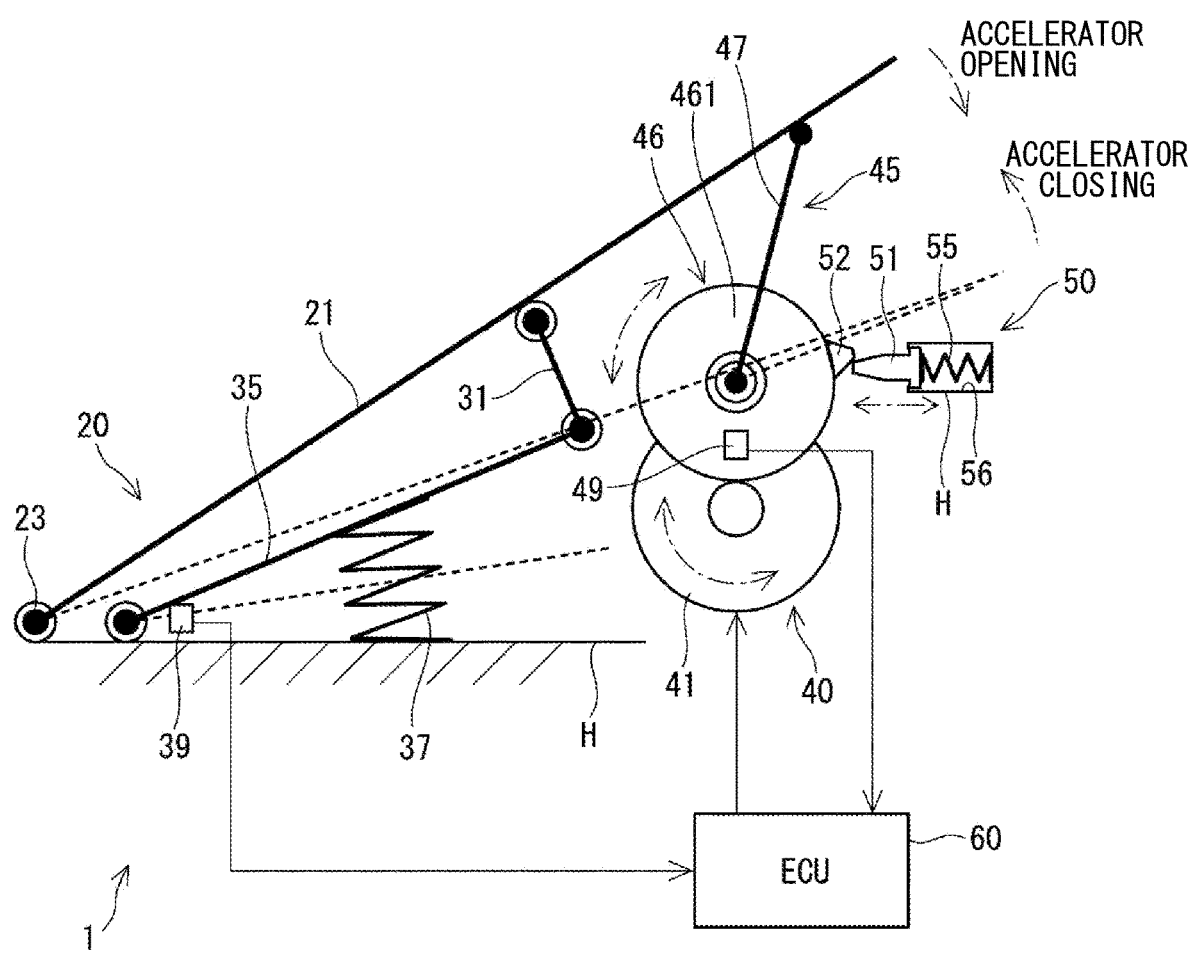
FIG. 2 is a schematic diagram illustrating a state where a pedal lever is locked in the accelerator pedal system according to the first embodiment.

A pedal biasing member 37 is a compression coil spring and biases the pedal 35 in an accelerator closing direction, with one end fixed to the pedal 35 and the other end fixed to the housing H. In FIGS. 1 and 2, the solid lines depict a state of fully closed acceleration, and the broken lines depict a state of fully opened acceleration.

The actuator 40 includes the motor 41 and a power transmission mechanism 45. The motor 41 is, for example, a DC motor, and driving of the motor 41 is controlled by the ECU 60. The driving force of the motor 41 is transmitted to the pedal lever 20 via the power transmission mechanism 45. For example, the actuator 40 is a series of components that transmits power from the motor 41 as a drive source to the pedal lever 20 via the power transmission mechanism 45.

The power transmission mechanism 45 includes a gear set 46, a power transmission member 47, and the like. The gear set 46 is configured with: a motor gear that rotates integrally with a motor shaft; and a plurality of gears that mesh with the motor gear, and the gear set 46 transmits the driving force of the motor 41 to the power transmission member 47. The gear set 46 includes a gear 461 that is provided with a locked portion 52 to be locked, which is described later. The gear 461 is provided with a position sensor 49 that detects a rotational position. Hereinafter, the rotational directions of the motor 41, the gear 461, and the like when the gear 461 is rotated counterclockwise on the paper surface are defined as positive, and the rotational directions of the motor 41, the gear 461, and the like when the gear 461 is rotated clockwise on the paper surface are defined as negative.

The power transmission member 47 is, for example, a cam, and one end side of the power transmission member 47 meshes with the gear set 46, so that the power transmission member 47 is rotationally driven by driving of the motor 41. The other end side of the power transmission member 47 is in contact with the pedal lever 20. With this arrangement, the driving force of the motor 41 is transmitted to the pedal lever 20. In FIG. 1, the other end of the power transmission member 47 is in contact with the pad 21, but may be in contact with the arm 31 or the pedal 35.

When the motor 41 is rotated in the positive direction in a state where the power transmission member 47 and the pedal lever 20 are in contact with each other, a reaction force in a push-back direction can be applied to the pedal lever 20. In addition, when no reaction force is applied to the pedal lever 20, it is desirable to rotate the motor 41 in the negative direction and to retract the power transmission member 47 so that the pedal lever 20 and the power transmission member 47 are not in contact with each other in the entire range from the fully closed state to the fully opened state of the pedal lever 20. Therefore, when no reaction force is applied, it is possible to avoid a cogging torque or the like from the power transmission mechanism 45 side from affecting a pedal force.

By applying a reaction force in the push-back direction to the pedal lever 20 by the motor 41, for example, by applying a reaction force to provide a sense of wall when a fuel consumption is determined, on the basis of the driving situation, to be deteriorated if the pad 21 is stepped on, the stepping on of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The lock mechanism 50 includes a locking member 51, the locked portion 52 to be locked, a resilient member 55, and the like. The locking member 51 has a tapered surface formed on one end side of the locking member 51 and is disposed such that the tapered surface is in contact with the locked portion 52. The other end side of the locking member 51 is accommodated in an accommodation chamber 56 formed on the housing H and is provided to be reciprocally movable in the axial direction. The locked portion 52 is provided to protrude from the gear 461 constituting the gear set 46, and rotates integrally with the gear 461. The locked portion 52 comes into contact with the locking member 51 on the tapered surface.

The resilient member 55 is accommodated in the accommodation chamber 56 provided on the housing H. One end of the resilient member 55 is in contact with the locking member 51, and the other end is engaged with the housing H, whereby the resilient member 55 biases the locking member 51 toward the locked portion 52.

FIG. 1 illustrates a state when locking is just started. When the gear 461 is rotated counterclockwise on the paper surface by the driving force of the motor 41 in a state where the locked portion 52 and the locking member 51 are in contact with each other, the locked portion 52 pushes the locking member 51 to compress the resilient member 55. When the gear 461 is further rotated counterclockwise and the locked portion 52 goes over and gets around the locking member 51 to the upper side on the paper surface, the locking member 51 returns to the initial position by the biasing force of the resilient member 55.

As illustrated in FIG. 2, in a locked state, since the locking member 51 latches the locked portion 52 by the biasing force of the resilient member 55, the rotation of the gear 461 is restricted. In addition, the power transmission member 47 functions as a locking force transmission member, so that the operation of the pedal lever 20 is restricted. As a result, the operation of the pedal lever 20 can be restricted in a non-energized state in which the energization of the motor 41 is turned off.

Hereinafter, to restrict the operation of the pedal lever 20 is simply referred to as "to lock". For example, during automatic driving or the like, it is possible to secure comfort by locking the pedal lever 20 and by making the pad 21 function as a footrest. In the present embodiment, the description is given, assuming that the pedal lever 20 is locked at a fully closed position.

When the gear 461 is rotated clockwise on the paper surface from the locked state illustrated in FIG. 2 by the driving force of the motor 41, the locked portion 52 pushes the locking member 51, so that the resilient member 55 is compressed. When the locked portion 52 goes over and gets around the locking member 51 to the lower side on the paper surface, the locked state is released, so that the locking member 51 returns to the initial position by the biasing force of the resilient member 55. Also, when a predetermined pedal force or more pedal force is applied to the pedal lever 20, the locked state can be similarly released.

When the pedal lever 20 is kept unlocked, it is desirable to further rotate the gear 461 clockwise from the state illustrated in FIG. 1 to retract the locked portion 52 so that the locking member 51 and the locked portion 52 will not come into contact with each other.

Figure 3:
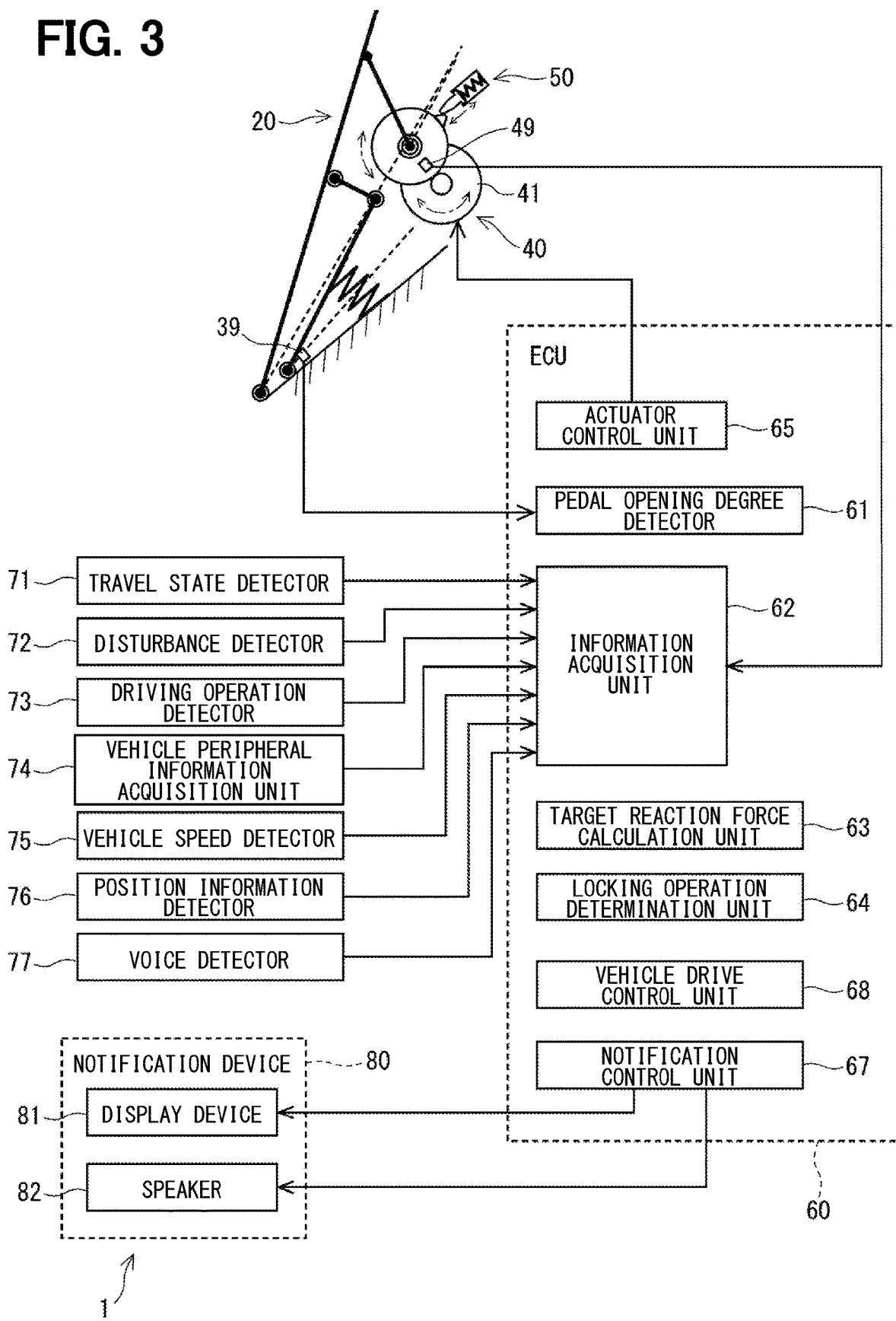
FIG. 3 is a block diagram illustrating a control configuration of the accelerator pedal system according to the first embodiment.

As illustrated in FIG. 3, the ECU 60 is mainly configured with a microcomputer or the like, and includes therein: a central processing unit (CPU), a read-only memory (ROM), a random-access memory (RAM), an input/output interface (I/O), which are not illustrated; a bus line that connects these components; and other components. Processes in the ECU 60 may be realized by software processing that is performed by the CPU executing a program previously stored in a physical memory device such as a ROM or the like (that is, a readable non-transitory tangible recording medium), and the processes may be realized by hardware processing performed by a dedicated electronic circuit.

The ECU 60 includes, as functional blocks: a pedal opening degree detector 61; an information acquisition unit 62; a target reaction force calculation unit 63; a locking operation determination unit 64; an actuator control unit 65; a notification control unit 67; a vehicle drive control unit 68; and the like. Although the ECU 60 is depicted as a single ECU 60 in FIG. 3, some of the functions may be configured with a separate ECU or the like.

The pedal opening degree detector 61 detects the pedal opening degree θ on the basis of a detection value of the pedal opening degree sensor 39. The information acquisition unit 62 acquires various types of information from the following components: the position sensor 49, a travel state detector 71, a disturbance detector 72, a driving operation detector 73, a vehicle peripheral information acquisition unit 74, a vehicle speed detector 75, a position information detector 76, a voice detector 77, and the like.

The target reaction force calculation unit 63 calculates a target reaction force to be applied to the pedal lever 20. On the basis of various types of information acquired by the information acquisition unit 62, the locking operation determination unit 64 makes a determination related to switching between a locked state in which the pedal lever 20 is locked and an unlocked state in which the pedal lever 20 is not locked. Hereinafter, as appropriate, switching from the unlocked state to the locked state is referred to as "lock activation", and switching from the locked state to the unlocked state is referred to as "lock releasing". The actuator control unit 65 controls driving of the motor 41 on the basis of the target reaction force, a determination result of the locking operation determination unit 64, and the like.

The notification control unit 67 notifies the notification device 80 of information to be notified of to the driver. In the present embodiment, information related to lock activation and lock releasing of the pedal lever 20 is notified of. The vehicle drive control unit 68 controls driving of the vehicle 100 (see FIG. 5A) The travel state detector 71 detects a driving mode as a traveling state. The driving mode includes an override mode in addition to an automatic driving mode and a manual driving mode. The control in the automatic driving mode is a cruise control such as an adaptive cruise control (ACC), but details of the control does not matter. In the override mode, both an input from the control by the automatic driving and a step-on input from the driver are input, and the input by the step-on operation of the driver is always prioritized in the override mode.

The disturbance detector 72 detects a disturbance on the basis of information of a G sensor that detects acceleration, a suspension behavior detection device, an indoor camera 95 (see FIG. 7), and the like. The disturbance includes, for example, a deceleration G caused by relatively rapid deceleration, a vehicle vibration caused by a stepped road surface and the like. Further, the disturbance may include non-driving-operation motions that are motions other than normal driving motions, for example, reseating of the driver, wearing and removing the seat belt, picking up a fallen object, stretching, and a driver's state of consciousness.

The driving operation detector 73 detects a turn signal operation and a steering wheel manipulation by the driver. The vehicle peripheral information acquisition unit 74 detects oncoming other vehicles, obstacles, and the like by road-to-vehicle communication, vehicle-to-vehicle communication, an onboard camera, radar, and the like.

The vehicle speed detector 75 detects a vehicle speed, which is a traveling speed of the vehicle 100. The vehicle speed detector 75 does not have to use a vehicle speed sensor, and may be configured to detect the vehicle speed by performing calculation using positional data of the global positioning system (GPS). The position information detector 76 detects the current position of the vehicle 100 on the basis of information from map information, GPS, road-to-vehicle communication, an onboard camera, and the like. The position information detector 76 may use the above-described types of information alone or in combination. In addition, information other than the above-described information may be used.

The voice detector 77 detects a voice emitted by an occupant. The notification device 80 includes: a display device 81, which is a display or the like; and a speaker 82, and notifies the driver of various types of information.

For example, in a case where a negative acceleration (hereinafter, "deceleration G") is applied due to rapid deceleration of the vehicle 100 or in a case where a vibration due to a stepped road surface, there is a possibility that a pedal force is applied to the pedal lever 20, which is functioning as a footrest, even if the driver does not intend to accelerate. In the present embodiment, since the lock mechanism 50 can hold the locked state without energization, the motor 41 is not energized during the lock operation. In view of the above, in the present embodiment, when a disturbance is detected, the motor 41 is energized to increase a lock holding force, thereby preventing lock releasing not intended by the driver.

Figure 4:
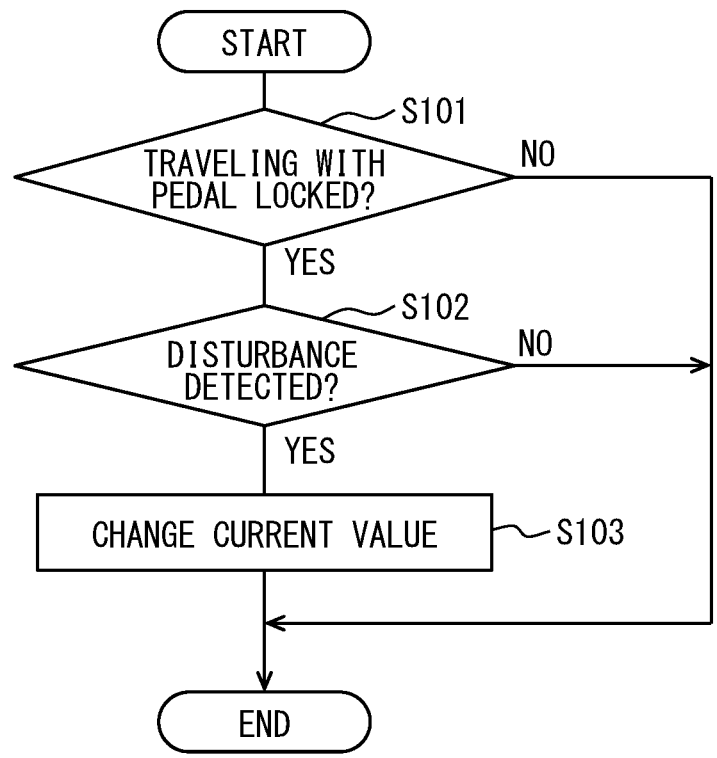
FIG. 4 is a flow diagram showing a locking operation control process according to the first embodiment.

A locking operation control process of the present embodiment will be described with reference to the flowchart of FIG. 4. This process is performed by the ECU 60 at a predetermined cycle. Hereinafter, the term "step" such as step S101 is omitted, and is simply written as the symbol "S".

In S101, the ECU 60 determines whether the vehicle is traveling with the pedal lever 20 locked. Hereinafter, traveling in a state where the pedal lever 20 is locked is referred to as pedal-locked traveling. If it is determined that the vehicle is not in a state of pedal-locked traveling (S101: NO), the processes of S102 and the following steps are skipped. If it is determined that the vehicle is in a state of pedal-locked traveling (S101: YES), the process proceeds to S102.

In S102, the locking operation determination unit 64 determines whether a disturbance is detected. The disturbance will be described later with reference to FIGS. 5A to 7. If it is detected that a disturbance is not detected (S102: NO), the process of S103 is skipped. If it is determined that a disturbance is detected (S102: YES), the process proceeds to S103. In S103, the actuator control unit 65 changes a value of a current supplied to the motor 41 to increase the lock holding force.

Figure 5A:
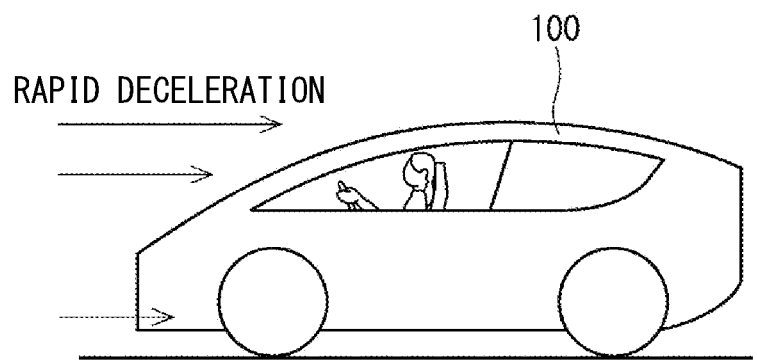
FIG. 5A is a diagram illustrating a state of a vehicle rapid deceleration.
Figure 5B:
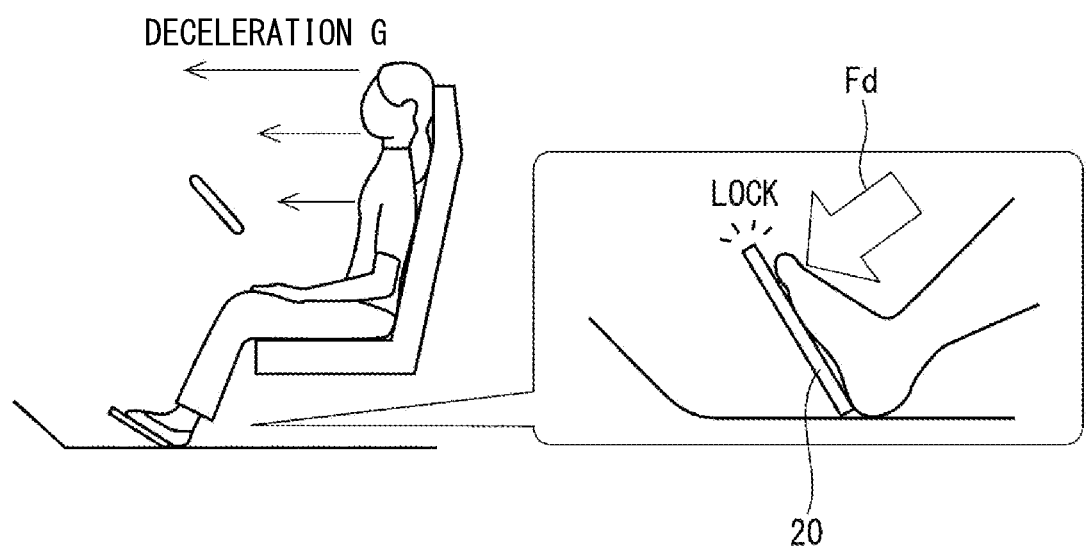
FIG. 5B is a diagram illustrating a disturbance-induced pedal force due to a deceleration G.

Here, a specific example of the disturbance will be described. When the vehicle 100 rapidly decelerates as illustrated in FIG. 5A, a deceleration G occurs as illustrated in FIG. 5B, and there is a possibility that the pedal lever 20 is unintentionally stepped on due to a disturbance-induced pedal force Fd. To address this issue, in the present embodiment, when the deceleration G exceeds a determination threshold value, it is detected as a disturbance.

Figure 6A:
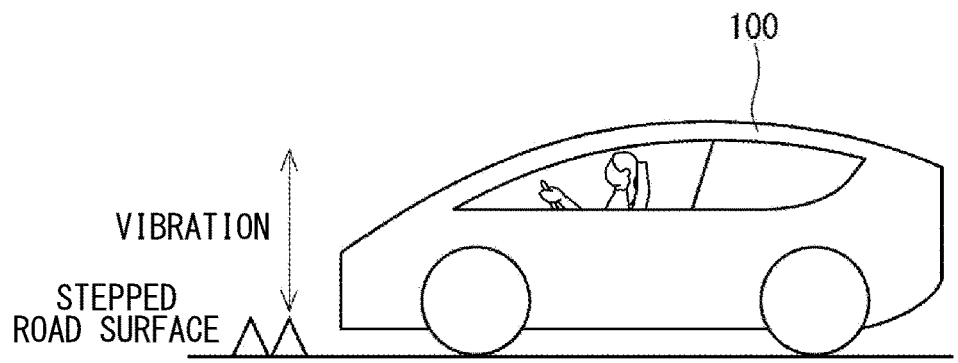
FIG. 6A is a diagram illustrating a state where a vibration occurs on a vehicle.
Figure 6B:
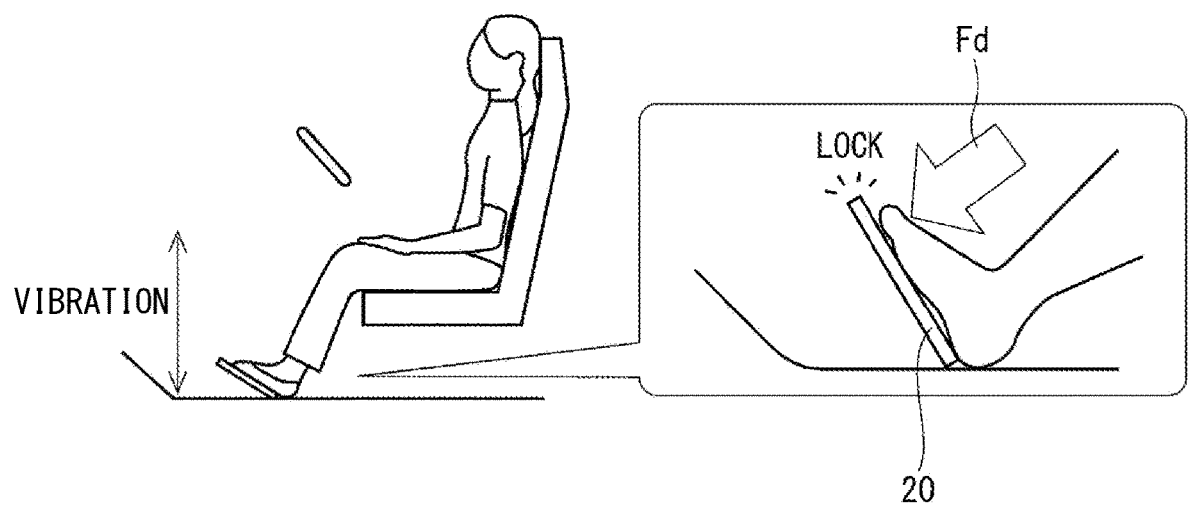
FIG. 6B is a diagram illustrating a disturbance-induced pedal force due to the vibration.

As illustrated in FIG. 6A, when a vibration is generated on the vehicle 100 due to a stepped road surface or the like, there is a possibility that the pedal lever 20 is unintentionally stepped on due to a disturbance-induced pedal force Fd as illustrated in in FIG. 6B. Therefore, in the present embodiment, when a detection value related to the vibration detected by the G sensor or a suspension behavior detection device exceeds a determination threshold, the detection value is detected as a disturbance.

Figure 7:
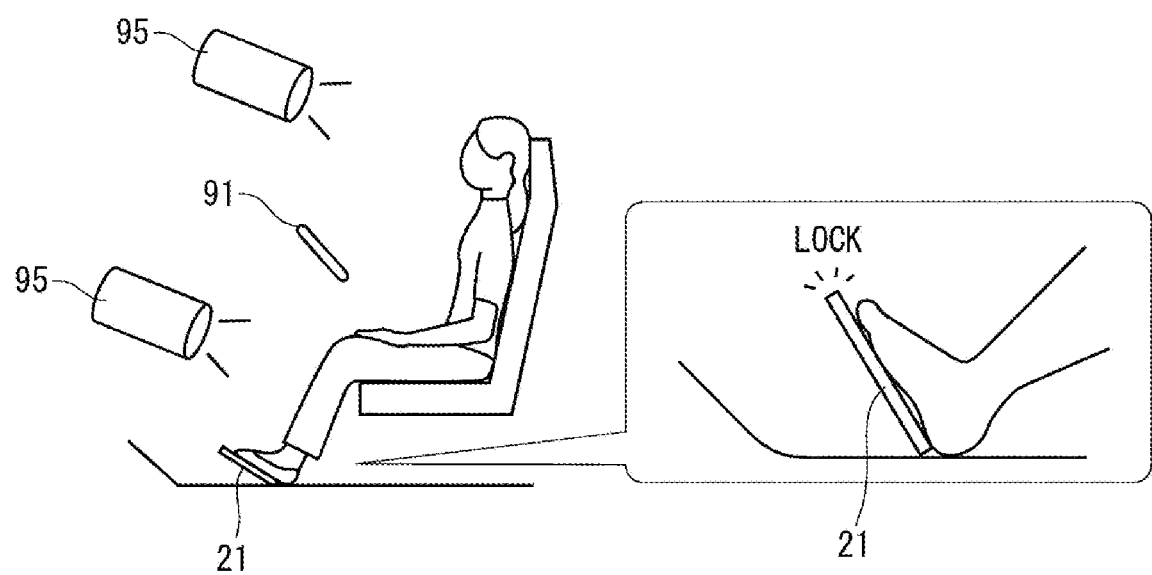
FIG. 7 is an explanatory diagram for showing how to detect a disturbance by a camera.

As illustrated in FIG. 7, when the driver's non-driving motion is detected by the indoor camera 95, it is detected as a disturbance. The non-driving motion includes, for example, reseating, wearing and removing the seat belt, picking up a fallen object, stretching, and a physical abnormality.

Figure 8:
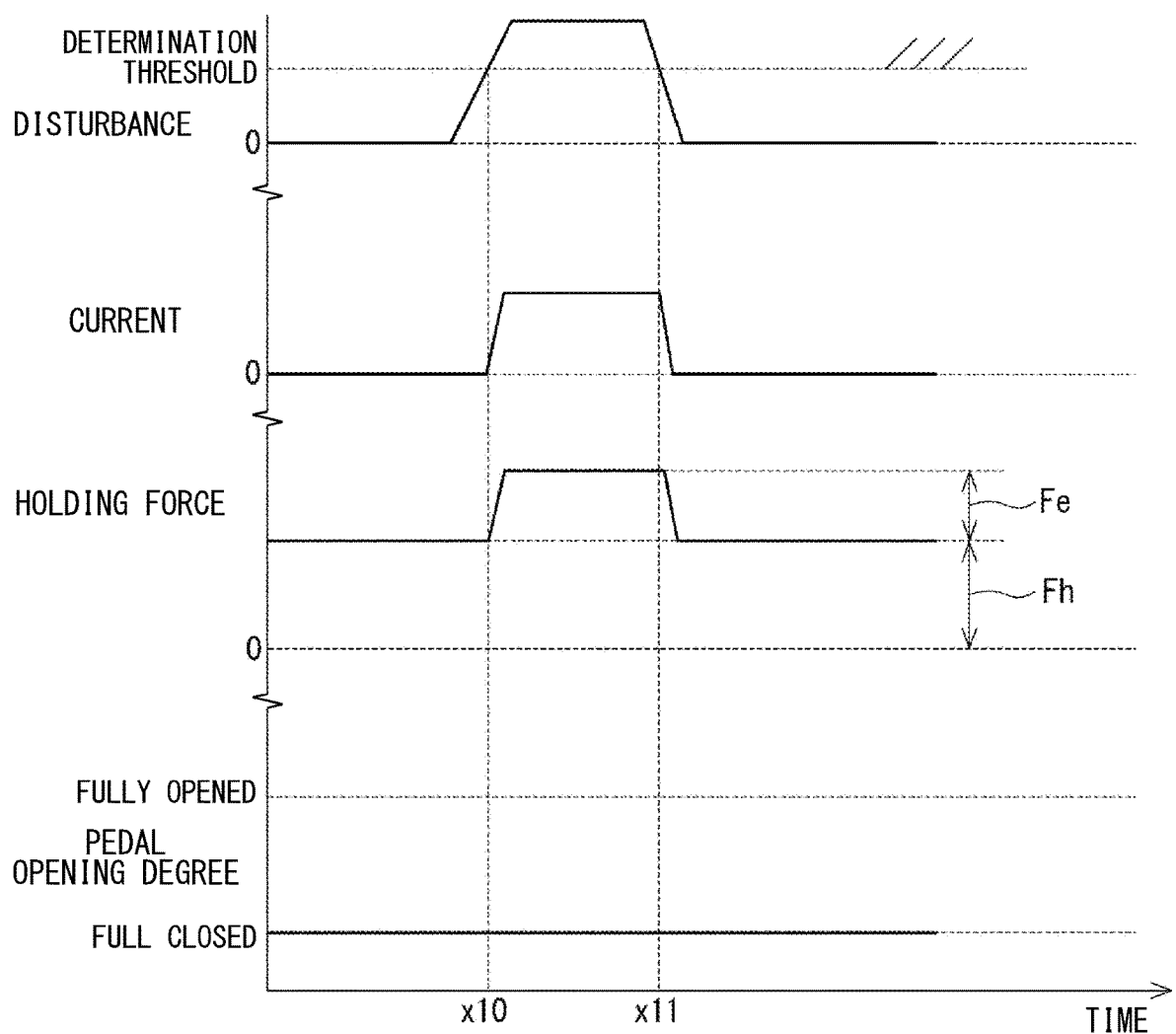
FIG. 8 is a time chart showing the locking operation control process according to the first embodiment.

The locking operation control process of the present embodiment will be described with reference to the time chart of FIG. 8. In FIG. 8, the horizontal axis represents a common time axis, and a disturbance, a current supplied to the motor 41, a lock holding force of the lock mechanism 50, and a pedal opening degree θ are illustrated from the top. The same applies to a time chart, to be described later, according to the embodiment.

It is assumed that, before time x10, pedal-locked traveling is being performed with no disturbance occurring. When the disturbance exceeds the determination threshold at time x10, the value of the current supplied to the motor 41 is changed. In the present embodiment, since the locked state is held without energization, the motor 41 is started to be energized at time x10. In addition to a non-energized lock holding force Fh, the energization of the motor 41 generates an energized lock holding force Fe that is a holding force by the energization, so that the lock holding force is increased, and it is possible to prevent lock releasing, due to a disturbance, not intended by the driver.

When the disturbance becomes smaller than the determination threshold at time x11, the energization of the motor 41 is terminated. FIG. 8 illustrates an example in which a disturbance is detected by a threshold determination of a deceleration G and a vibration component, but a disturbance is similarly detected also by using the indoor camera 95.

As described above, the accelerator pedal system 1 of the present embodiment includes the pedal lever 20, the lock mechanism 50, the actuator 40, and the ECU 60. The pedal lever 20 operates in accordance with a step-on operation. The operation of the pedal lever 20 can be restricted by the lock mechanism 50. Here, "the operation of the pedal lever can be restricted" is not limited to setting the movement amount to 0 by completely fixing the pedal lever 20, but is a concept including setting the movement amount to be smaller than that in the unlocked state. The actuator 40 switches between a locked state in which the operation of the pedal lever 20 is restricted by the lock mechanism 50 and an unlocked state in which the operation is not restricted.

The ECU 60 includes the locking operation determination unit 64 and the actuator control unit 65. The locking operation determination unit 64 determines switching of the locking operation by the lock mechanism 50. The actuator control unit 65 controls the driving of the actuator 40 in accordance with the determination result of the locking operation determination unit 64. In the present embodiment, the driving of the motor 41 is mainly controlled.

When a disturbance is detected during traveling in the locked state, the actuator control unit 65 changes an energization amount to the actuator 40. With this arrangement, it is possible to prevent or reduce acceleration, due to an influence of the disturbance, not intended by the driver.

In detail, when a disturbance is detected during traveling in the locked state, the actuator control unit 65 changes the energization amount to the actuator 40 so as to increase a lock holding force by the lock mechanism 50. As a result, it is possible to prevent or reduce lock releasing, due to an influence of the disturbance, not intended by the driver.

The disturbance is a negative acceleration applied at the time of vehicle deceleration. The disturbance is a vibration in a vertical direction of a vehicle. Furthermore, the disturbance is a non-driving motion of the driver. When these disturbances are detected, it is possible to prevent or reduce acceleration not intended by the driver, by changing the energization amount to the motor 41. In the present embodiment, the disturbance includes a deceleration G, a vibration component, and a non-driving motion, but some of the above may be omitted, or another element may be detected as a disturbance.

The lock mechanism 50 can hold the locked state while the energization to the actuator 40 is turned off. When a disturbance is detected, the actuator control unit 65 starts energization to the actuator 40 from a state in which the actuator 40 is not energized. When the energization to the motor 41 is turned off in the locked state, there is a higher risk of the locked state being released due to the influence of a disturbance or the like than in the case where the motor 41 is continuously energized by, for example, a feedback control or the like. In the present embodiment, it is possible to prevent or reduce lock releasing by starting energization to the motor 41 when a disturbance is detected.

Second Embodiment

A second embodiment will be described with reference to FIGS. 9 and 10. In the second embodiment and a third embodiment, the locking operation control process is different from that of the above embodiment; therefore, this point will be mainly described. The processes of S201 and S202 are the same as the processes of S101 and S102 in FIG. 4.

In S203, the locking operation determination unit 64 determines whether the lock releasing of the pedal lever 20 is detected. If it is determined that the locking of the pedal lever 20 is not released (S203: NO), the processes of S204 and the following steps are skipped. If it is determined that the locking of the pedal lever 20 is released (S203: YES), the process proceeds to S204.

In S204, the actuator control unit 65 changes the value of the current supplied to the motor 41. In the present embodiment, since the motor 41 is not energized while the pedal lever 20 is locked, the motor 41 is energized to re-lock the pedal lever 20.

In S205, the locking operation determination unit 64 determines whether the pedal lever 20 is re-locked. If it is determined that the pedal lever 20 is not re-locked (S205: NO), the energization of the motor 41 is continued. If it is determined that the pedal lever 20 is re-locked (S205: YES), the process proceeds to S206.

In S206, the actuator control unit 65 cancels the change of the value of the current supplied to the motor 41. In the present embodiment, the energization to the motor 41 is turned off. However, similarly to the first embodiment, even if the pedal lever 20 is not unlocked, the current of the changed value may be continuously supplied as long as the disturbance is detected.

The locking operation control process of the present embodiment will be described with reference to the time chart of FIG. 10. Here, a description is given assuming that the non-energized lock holding force Fh and the energized lock holding force Fe are equal, but the non-energized lock holding force Fh and the energized lock holding force Fe may be different. When the disturbance-induced pedal force Fd increases due to the disturbance occurring at time x20 and the disturbance-induced pedal force Fd exceeds the non-energized lock holding force Fh at time x21, the locked state of the pedal lever 20 is released by the disturbance-induced pedal force Fd.

When the disturbance-induced pedal force Fd is held at time x22, the pedal lever 20 holds the pedal opening degree θ at a position where the disturbance-induced pedal force Fd and the energized lock holding force Fe are balanced. When the disturbance-induced pedal force Fd starts to decrease at time x23 and becomes smaller than the energized lock holding force Fe at time x24, the pedal opening degree θ decreases.

When the pedal opening degree θ returns to a lock operation position at time x25, the pedal lever 20 is locked, and the energization to the motor 41 is turned off at time x26 when the pedal is completely locked. The energization may be turned off after a predetermined time elapses from the completion of the pedal lock.

The lock mechanism 50 of the present embodiment can hold a locked state without energization, and the energization of the motor 41 is turned off during the locked state; therefore, when the locking is unintentionally released due to a disturbance, there is a possibility that acceleration not intended by the driver occurs. To address this issue, in the present embodiment, by energizing the motor 41 when the locking is released due to a disturbance, it is possible to prevent acceleration not intended by the driver and to quickly return again to the locked state.

In the present embodiment, when the locked state is released in a state where a disturbance is detected during traveling in the locked state, the actuator control unit 65 changes an energization amount to the actuator 40 so that the pedal lever 20 is re-locked. As a result, even when the locking is unintentionally released due to a disturbance, it is possible to quickly return again to the locked state. Further, the same effects as the above embodiments are provided.

Third Embodiment

Figure 11:
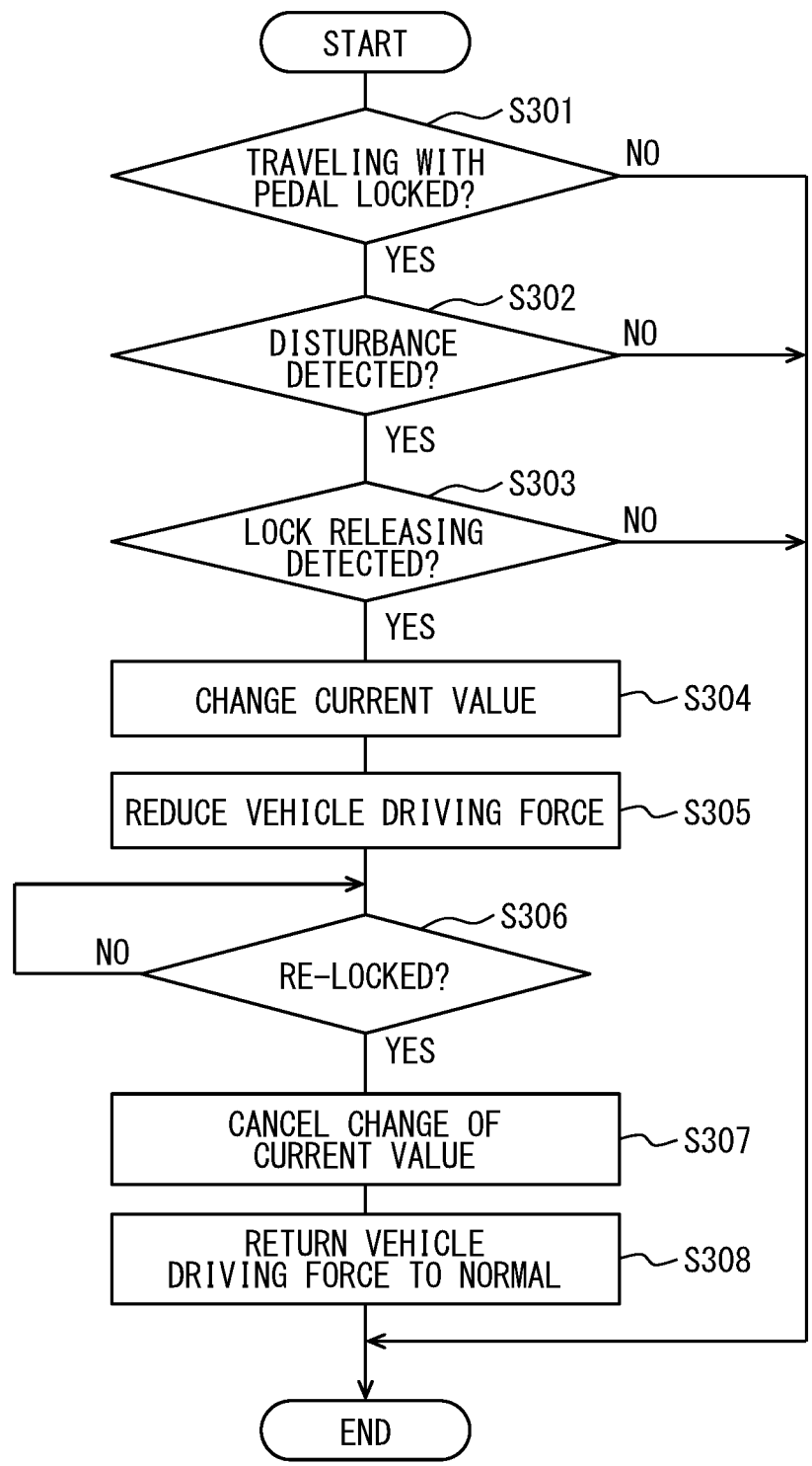
FIG. 11 is a flowchart showing a locking operation control process according to a third embodiment.
Figure 12:
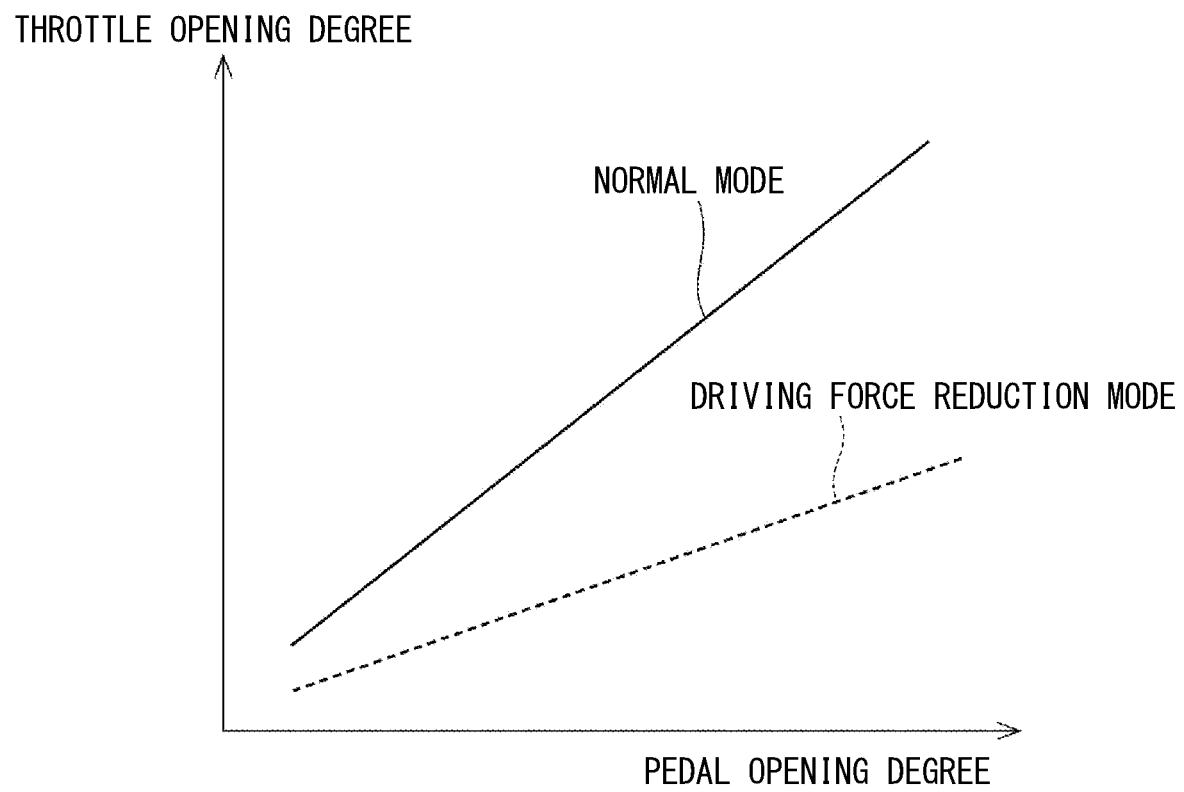
FIG. 12 is an explanatory diagram for showing reduction of driving force according to the third embodiment.
Figure 13:
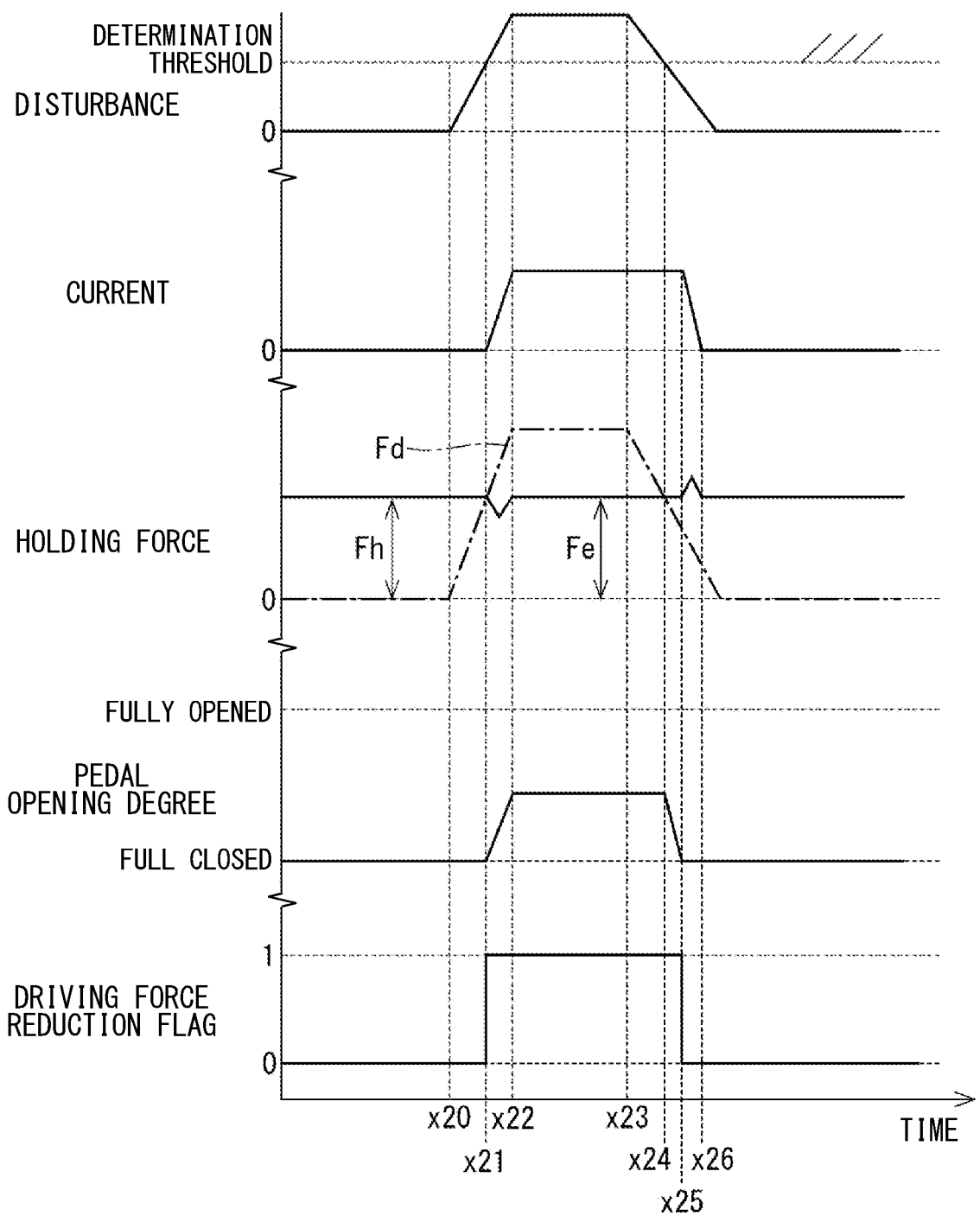
FIG. 13 is a time chart showing the locking operation control process according to the third embodiment.

A third embodiment will be described with reference to FIGS. 11 to 13. A locking operation control process of the present embodiment will be described with reference to the flowchart of FIG. 11. The processes of S301 to S304 are the same as the processes of S201 to S204 in FIG. 9.

In S305 following S304, the vehicle drive control unit 68 reduces a vehicle driving force corresponding to a pedal opening degree θ. In detail, the vehicle drive control unit 68 sets the driving force reduction flag and switches a drive mode from a normal mode to a driving force reduction mode.

The reduction of the driving force with respect to the pedal opening degree θ will be described in detail with reference to FIG. 12. In FIG. 12, the horizontal axis represents the pedal opening degree θ, the vertical axis represents a throttle opening degree. The normal mode is depicted by a solid line, and the driving force reduction mode is depicted by a broken line. In the present embodiment, when the pedal lever 20 is unlocked due to a disturbance, the driving force reduction mode is performed such that the throttle opening degree with respect to the pedal opening degree θ is reduced so as to reduce the vehicle driving force with respect to the pedal opening degree θ. When the vehicle 100 is an electric vehicle, an output of a main motor with respect to the pedal opening degree θ may be reduced.

Figure 9:
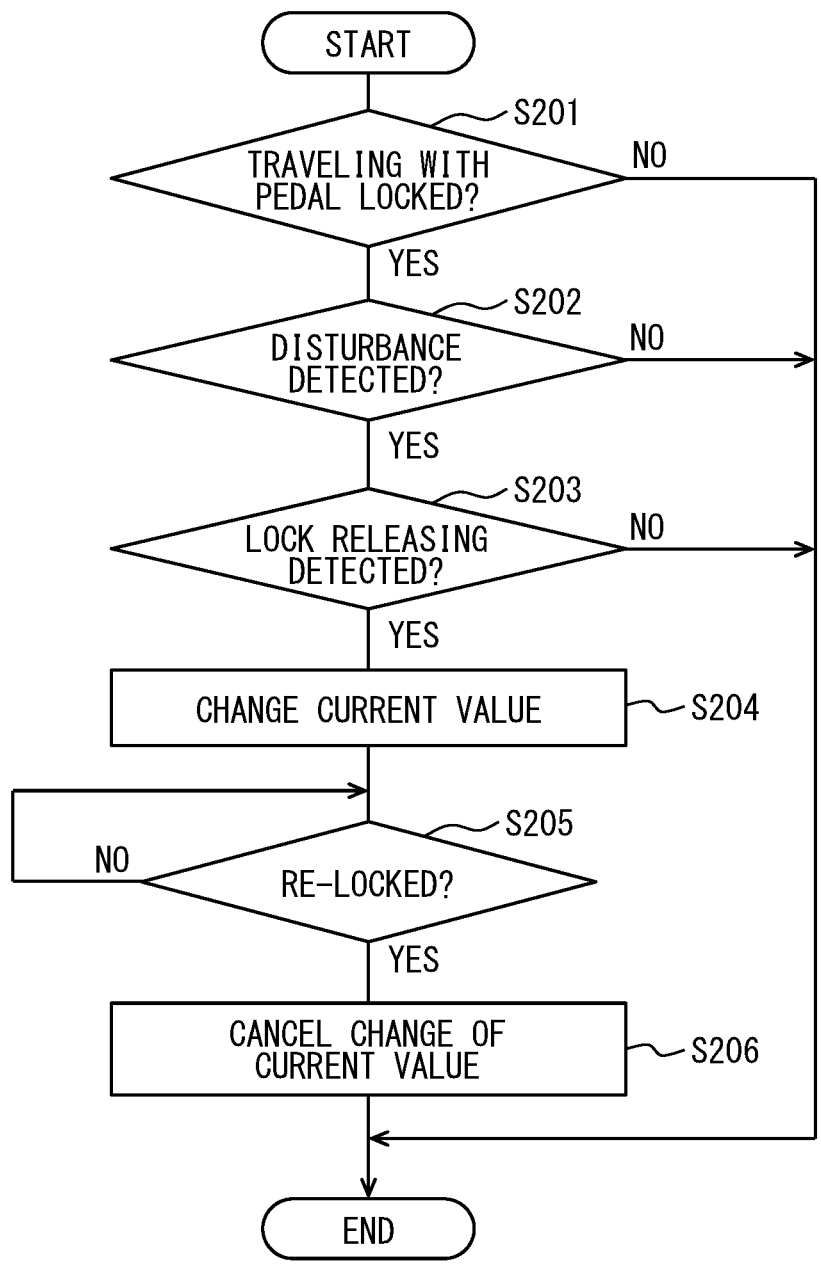
FIG. 9 is a flowchart showing a locking operation control process according to a second embodiment.
Figure 10:
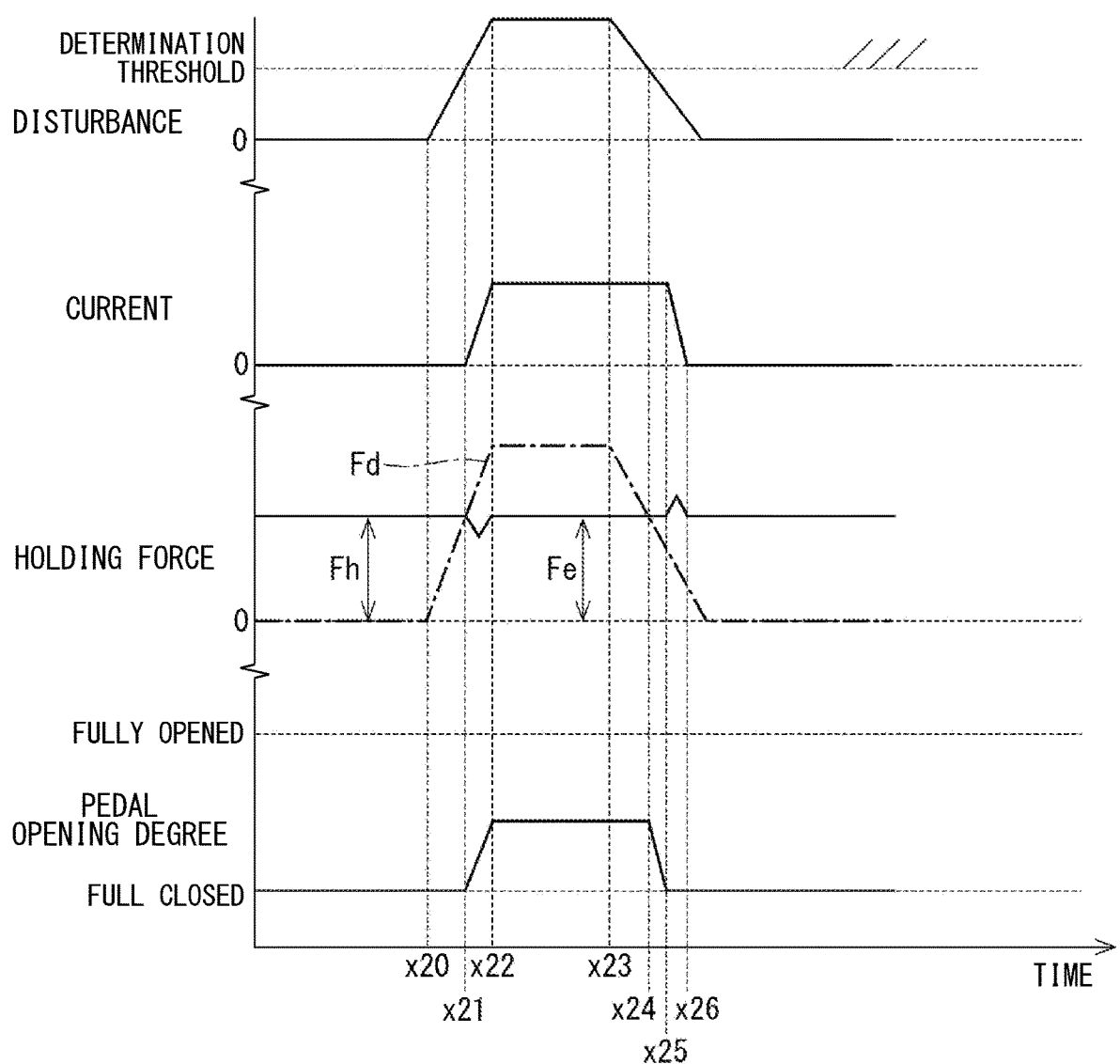
FIG. 10 is a time chart showing the locking operation control process according to the second embodiment.

With reference to FIG. 11 again, the processes of S306 and S307 are the same as the processes of S205 and S206 in FIG. 9. In S308 following S307, vehicle drive control unit 68 returns the vehicle driving force with respect to the pedal opening degree θ to normal. In detail, the driving force reduction flag is reset, and the drive mode is switched from the driving force reduction mode to the normal mode.

The locking operation control process of the present embodiment will be described with reference to the time chart of FIG. 13. In FIG. 13, a driving force reduction flag is added below the pedal opening degree θ in FIG. 10. Because the disturbance, the energized lock holding force, and the pedal opening degree θ behave similarly to those in FIG. 10, the description thereof will be omitted, and the driving force reduction flag will be mainly described.

At time x21 when the locked state of the pedal lever 20 is released by a disturbance-induced pedal force Fd, the driving force reduction flag is set, and the vehicle driving force with respect to the pedal opening degree θ is reduced. At time x25 when the pedal lever 20 is re-locked, the driving force reduction flag is reset, and the vehicle driving force with respect to the pedal opening degree θ is returned to normal. In the pedal locked state, the driving of the vehicle 100 is controlled by the automatic driving control, not depending on the pedal opening degree θ.

When a disturbance is occurring, the pedal lever 20 can sometimes be unintentionally unlocked due to the influence of the disturbance. To address this issue, in the present embodiment, when the pedal lever is released in a state where a disturbance is occurring, the vehicle driving force with respect to the pedal opening degree θ is reduced. As a result, it is possible to prevent or reduce acceleration not intended by the driver. Further, the same effects as the above embodiments are provided.

Other Embodiments

In the above embodiments, the locking member 51 is provided on a fixed side, and the locked portion 52 is provided on a movable side. In other embodiments, a locking member may be provided on a movable side, and a locked portion may be provided on the fixed side. In the above embodiments, the locked portion is formed of a projection. In other embodiments, the locked portion may be formed of a recess. One of the locked portion and the locking member does not have to be provided on a spur gear, and may be provided on a member that is not a spur gear and constitutes the power transmission mechanism.

In the above embodiments, the locking member is provided to be movable in a linear direction along the axial direction of the resilient member, which is a compression coil spring. In other embodiments, the locked state and the unlocked state may be switched by rotation of the locking member. When the state of locking is switched by rotation of the locking member, it is possible to prevent or reduce uneven wear of an abutting portion. In other embodiments, the resilient member does not have to be a compression coil spring, and may be a torsion spring, for example. Alternatively, the locking member itself may be formed of an elastic member such as rubber, and may be elastically deformed to switch the state of locking.

In addition, the power transmission mechanism and the lock mechanism may be different from those in the above embodiments. The shapes of the locking member and the locked portion may be different from those in the above embodiments, depending on component layout or the like. In the above embodiments, a common actuator is used to apply a reaction force to the pedal lever and to activate a locking operation. In other embodiments, an actuator for applying a reaction force and an actuator for activating a lock operation may be separately provided.

In the above embodiments, the lock mechanism can hold the locked state in a non-energized state in which energization of the motor is turned off. In other embodiments, the lock mechanism may be configured to maintain the locked state by continuously energizing the motor.

In the above embodiments, the pedal lever is locked at the fully closed position by the lock mechanism. In other embodiments, the pedal lever may be locked at the fully opened position or may be locked at an intermediate position between the fully closed position and the fully opened position. Further, the pedal lever may be configured to be capable of being locked in a stepwise manner at a plurality of positions.

In other embodiments, a notification to the driver may be performed at at least one of the following times: when lock is activated, and when lock is released. Whether to notify or not to notify may be changed depending on situations. For example, a notification is performed immediately after the start of automatic driving, and a notification is not performed at the time of lock activation when an override is terminated during automatic driving. A driver's intention may be confirmed about lock activation and lock releasing.

For example, an accelerator pedal system may include a pedal lever, a lock mechanism, an actuator and a controller. The pedal lever may be configured to perform an operation in accordance with a step-on operation. The lock mechanism may be configured to restrict the operation of the pedal lever. The actuator may be configured to switch between a locked state in which the operation of the pedal lever is restricted by the lock mechanism and an unlocked state in which the operation of the pedal lever is free from restriction by the lock mechanism. The controller may be configured to control a driving operation of the actuator. For example, the controller may be configured to change an energization amount to the actuator to increase a lock holding force by the lock mechanism, in response to a detected disturbance during a vehicle traveling in the locked state.

A control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An accelerator pedal system comprising:
   a pedal lever configured to perform an operation in accordance with a step-on operation;
   a lock mechanism configured to restrict the operation of the pedal lever;
   an actuator configured to switch between a locked state in which the operation of the pedal lever is restricted by the lock mechanism and an unlocked state in which the operation of the pedal lever is free from restriction by the lock mechanism; and
   a controller including an actuator control unit configured to control a driving operation of the actuator,
   wherein the actuator control unit is configured to change an energization amount to the actuator when a disturbance is detected during a vehicle traveling in the locked state;
   wherein the lock mechanism holds the locked state in a state where energization to the actuator is turned off, and
   when the disturbance more than a determination threshold is detected, the controller starts energization to the actuator from a state in which the actuator is not energized, to prevent a lock releasing, and
   when the disturbance is detected to be smaller than the determination threshold in the locked state, the controller terminates the energization to the actuator to maintain the locked state.

2. The accelerator pedal system according to claim 1, wherein
   the actuator control unit is configured to change the energization amount to the actuator to increase a lock holding force by the lock mechanism, when the disturbance is detected during the vehicle traveling in the locked state.

3. The accelerator pedal system according to claim 1, wherein
   the actuator control unit is configured to change the energization amount to the actuator to cause the pedal lever to be re-locked, when the locked state is released in a state where the disturbance is detected during the vehicle traveling in the locked state.

4. The accelerator pedal system according to claim 1, wherein the disturbance is negative acceleration applied at a time of vehicle deceleration.

5. The accelerator pedal system according to claim 1, wherein the disturbance is a vibration in a vertical direction of a vehicle.

6. The accelerator pedal system according to claim 1, wherein the disturbance is a non-driving motion of a driver.

7. The accelerator pedal system according to claim 1, wherein:
   the lock mechanism is configured to hold the locked state in the state where the energization to the actuator is turned off with a non-energized lock holding force;
   the energization of the actuator generates an energized lock holding force; and
   the non-energized lock holding force and the energized lock holding force are added together to prevent the lock releasing.

8. The accelerator pedal system according to claim 7, wherein:
   when the disturbance is detected to become smaller than the determination threshold in the locked state, the controller terminates the energization to the actuator to terminate the energized lock holding force.

9. An accelerator pedal system comprising:
   a pedal lever configured to perform an operation in accordance with a step-on operation;
   a lock mechanism configured to restrict the operation of the pedal lever;
   an actuator configured to switch between a locked state in which the operation of the pedal lever is restricted by the lock mechanism and an unlocked state in which the operation of the pedal lever is free from restriction by the lock mechanism; and
   a controller configured to control a driving operation of the actuator, wherein
   the controller is configured to change an energization amount to the actuator to increase a lock holding force by the lock mechanism, in response to a detected disturbance during a vehicle traveling in the locked state;

wherein the lock mechanism holds the locked state in a state where energization to the actuator is turned off, and when the disturbance is detected more than a determination threshold, the controller starts energization to the actuator from a state in which the actuator is not energized, to prevent a lock releasing, and when the disturbance is detected to be smaller than the determination threshold in the locked state, the controller terminates the energization to the actuator to maintain the locked state.

10. The accelerator pedal system according to claim 9, further comprising a disturbance detector configured to detect the disturbance, wherein the controller is configured to change the energization amount to the actuator to cause the pedal lever to be re-locked, when the locked state is released in a state where the disturbance detector detects the disturbance during the vehicle traveling in the locked state.

11. The accelerator pedal system according to claim 9, wherein:

the lock mechanism is configured to hold the locked state in the state where the energization to the actuator is turned off with a non-energized lock holding force;

the energization of the actuator generates an energized lock holding force; and the non-energized lock holding force and the energized lock holding force are added together to prevent the lock releasing.

12. The accelerator pedal system according to claim 11, wherein:

when the disturbance is detected to become smaller than the determination threshold in the locked state, the controller terminates the energization to the actuator to terminate the energized lock holding force.

13. An accelerator pedal system comprising:

a pedal lever configured to perform an operation in accordance with a step-on operation;

a lock mechanism configured to restrict the operation of the pedal lever, the lock mechanism comprising:

a locking member, a biasing member, and an accommodation chamber, wherein the accommodation chamber is fixed relative to a pedal housing, the biasing member includes a first end and a second end, wherein the first end of the biasing member contacts a first end of accommodation chamber and the second end of the biasing member contacts the locking member to bias the locking member to protrude out of a second end of the accommodation chamber;

an actuator configured to switch between a locked state in which the operation of the pedal lever is restricted by the lock mechanism and an unlocked state in which the operation of the pedal lever is free from restriction by the lock mechanism; and a controller including an actuator control unit configured to control a driving operation of the actuator, wherein the actuator control unit is configured to increase an energization amount to the actuator to increase a lock holding force when a disturbance is detected during a vehicle traveling in the locked state in order to prevent lock releasing;

wherein the lock mechanism holds the locked state in a state where energization to the actuator is turned off.

14. The accelerator pedal system according to claim 13, wherein the actuator control unit is configured to change the energization amount to the actuator to increase a lock holding force by the lock mechanism, when the disturbance is detected during the vehicle traveling in the locked state.

15. The accelerator pedal system according to claim 13, wherein the actuator control unit is configured to change the energization amount to the actuator to cause the pedal lever to be re-locked, when the locked state is released in a state where the disturbance is detected during the vehicle traveling in the locked state.

16. The accelerator pedal system according to claim 13, wherein the disturbance is negative acceleration applied at a time of vehicle deceleration.

17. The accelerator pedal system according to claim 13, wherein the disturbance is a vibration in a vertical direction of a vehicle.

18. The accelerator pedal system according to claim 13, wherein the disturbance is a non-driving motion of a driver.

19. An accelerator pedal system comprising:

a pedal lever configured to perform an operation in accordance with a step-on operation;

a lock mechanism configured to restrict the operation of the pedal lever, the lock mechanism comprising:

a locking member, a biasing member, and an accommodation chamber, wherein the accommodation chamber is fixed relative to a pedal housing, the biasing member includes a first end and a second end, wherein the first end of the biasing member contacts a first end of accommodation chamber and the second end of the biasing member contacts the locking member to bias the locking member to protrude out of a second end of the accommodation chamber;

an actuator configured to switch between a locked state in which the operation of the pedal lever is restricted by the lock mechanism and an unlocked state in which the operation of the pedal lever is free from restriction by the lock mechanism; and a controller configured to control a driving operation of the actuator, wherein the controller is configured to increase an energization amount to the actuator to increase a lock holding force by the lock mechanism, in response to a detected disturbance during a vehicle traveling in the locked state in order to prevent lock releasing;

wherein the lock mechanism holds the locked state in a state where energization to the actuator is turned off.

20. The accelerator pedal system according to claim 19, further comprising a disturbance detector configured to detect the disturbance, wherein the controller is configured to change the energization amount to the actuator to cause the pedal lever to be re-locked, when the locked state is released in a state where the disturbance detector detects the disturbance during the vehicle traveling in the locked state.

\* \* \* \* \*